United States Patent [19]
Cummins

[11] Patent Number: 5,775,759
[45] Date of Patent: Jul. 7, 1998

[54] VEHICLE BED EXTENDER

[76] Inventor: Andrew J. Cummins, 6557 Forest Park, Troy, Mich. 48098

[21] Appl. No.: 719,408

[22] Filed: Sep. 24, 1996

[51] Int. Cl.$^6$ .................................................. B62D 33/08
[52] U.S. Cl. .................................................. 296/26; 296/57.1
[58] Field of Search .................................. 296/26, 50, 57.1

[56] References Cited

U.S. PATENT DOCUMENTS

| | | | |
|---|---|---|---|
| 797,900 | 8/1905 | Lowry. | |
| 2,872,239 | 2/1959 | Bowness et al. . | |
| 3,004,790 | 10/1961 | Mayer | 296/26 |
| 3,895,838 | 7/1975 | Hamada | 296/57 R |
| 4,472,639 | 9/1984 | Bianchi . | |
| 4,531,773 | 7/1985 | Smith | 296/26 |
| 4,778,213 | 10/1988 | Palmer . | |
| 5,154,470 | 10/1992 | Bringman, Jr. . | |
| 5,328,225 | 7/1994 | Melching et al. . | |
| 5,468,038 | 11/1995 | Sauri | 296/57.1 |

*Primary Examiner*—Gary C. Hoge
*Attorney, Agent, or Firm*—Bliss McGlynn, P.C.

[57] ABSTRACT

An extender for a bed of a vehicle includes a bottom section fixedly mounted to a tailgate of a bed of a vehicle. The extender also includes a rear section pivotally attached to the bottom section and opposed side sections pivotally attached to the rear section. The extender further includes a fastener mechanism to removably fasten the side sections to an inner surface of the bed.

11 Claims, 2 Drawing Sheets

5,775,759

1

VEHICLE BED EXTENDER

BACKGROUND OF THE INVENTION

1. Field of the Invention

The present invention relates generally to vehicle beds and, more particularly, to a retractable extender for a bed of a vehicle.

2. Description of the Related Art

It is known to provide a bed for a vehicle such as a pick-up truck. Typically, the bed is rectangular in shape to define a cargo area and is closed at the end by a tailgate. The tailgate is hinged to the bed to have an upright position to close the end of the bed and a down position to open the end of the bed.

Many of the pick-up trucks sold today have shorter beds or include crew/club or extended cabs which encroach into the space which would otherwise be employed for the cargo area. Short beds do not allow for loads of standard eight (8) foot material to be transported with the tailgate in the closed position. Hauling a load with the tailgate down may cause accidents or damage to the load and is illegal in some jurisdictions. Therefore, there is a need in the art to increase the useable space of the cargo area of a bed for a vehicle.

SUMMARY OF THE INVENTION

It is, therefore, one object of the present invention to provide an extender for a bed of a vehicle.

It is another object of the present invention to provide a bed extender for a pick-up truck.

It is yet another object of the present invention to provide a vehicle bed extender which is relatively simple to use and requires the effort of only one person.

To achieve the foregoing objects, the present invention is an extender for a bed of a vehicle. The extender includes a bottom section fixedly mounted to a tailgate of a bed of a vehicle. The extender also includes a rear section pivotally attached to the bottom section and opposed side sections pivotally attached to the rear section. The extender further includes a fastener mechanism to removably fasten the side sections to an inner surface of the bed.

One advantage of the present invention is that an extender is provided for a bed of a vehicle. Another advantage of the present invention is that a bed extender is provided for a bed of a pick-up truck. Yet another advantage of the present invention is that the vehicle bed extender is relatively simple to use and requires the effort of only one person. A further advantage of the present invention is that the vehicle bed extender extends the length of any pick-up truck bed to the full length of the bed plus the length of the tailgate when the extender is in the down and open position.

Other objects, features and advantages of the present invention will be readily appreciated as the same becomes better understood after reading the subsequent description taken in conjunction with the accompanying drawings.

2

DESCRIPTION OF THE PREFERRED EMBODIMENT(S)

Figure 1:
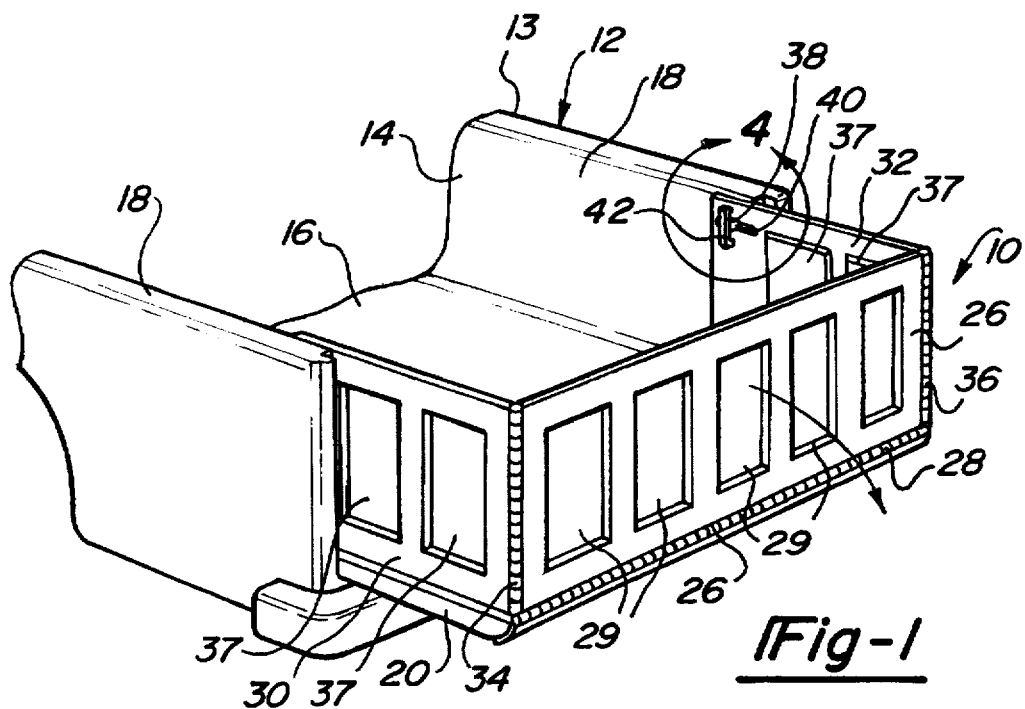
FIG. 1 is a perspective view of an extender, according to the present invention, illustrated in an upright and closed position with a bed of a vehicle.
Figure 2:
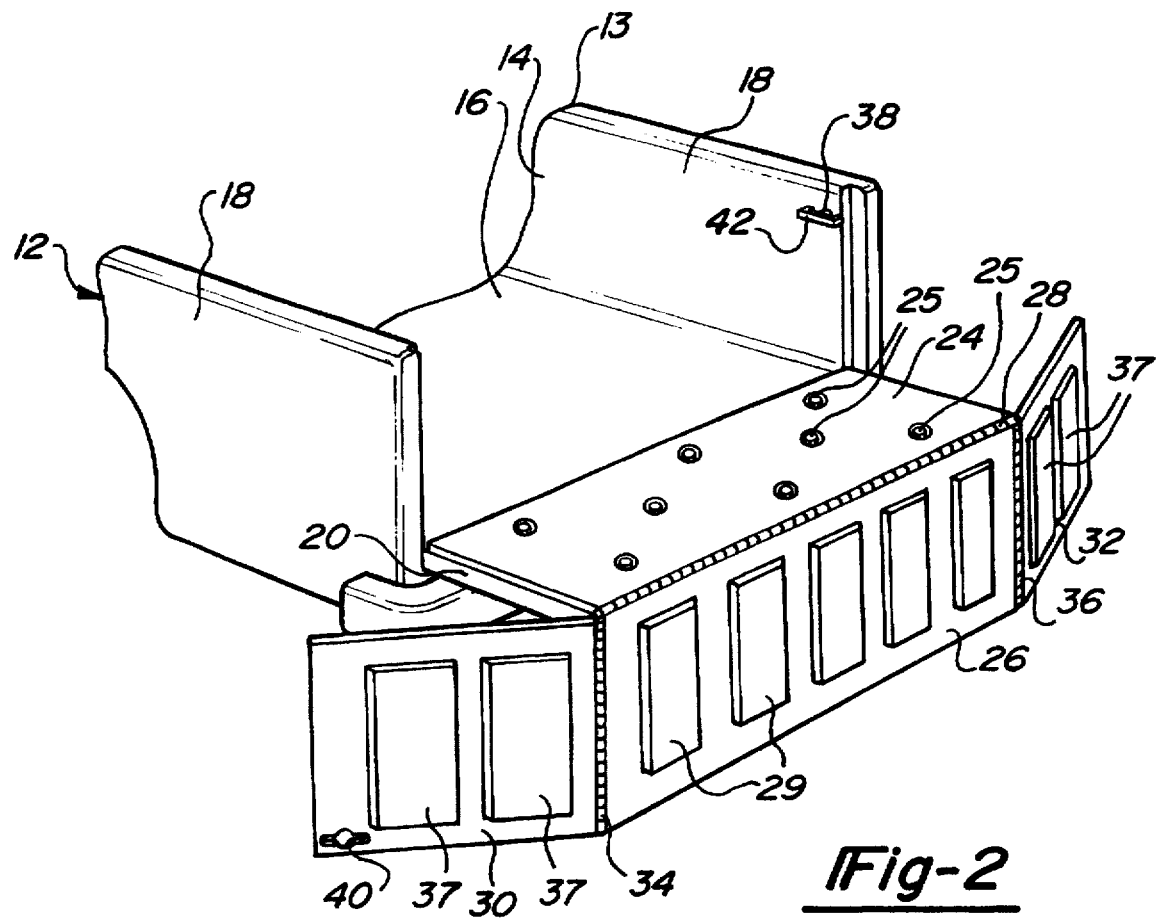
FIG. 2 is a view similar to FIG. 1 illustrating the extender in a down and open position.
Figure 3:
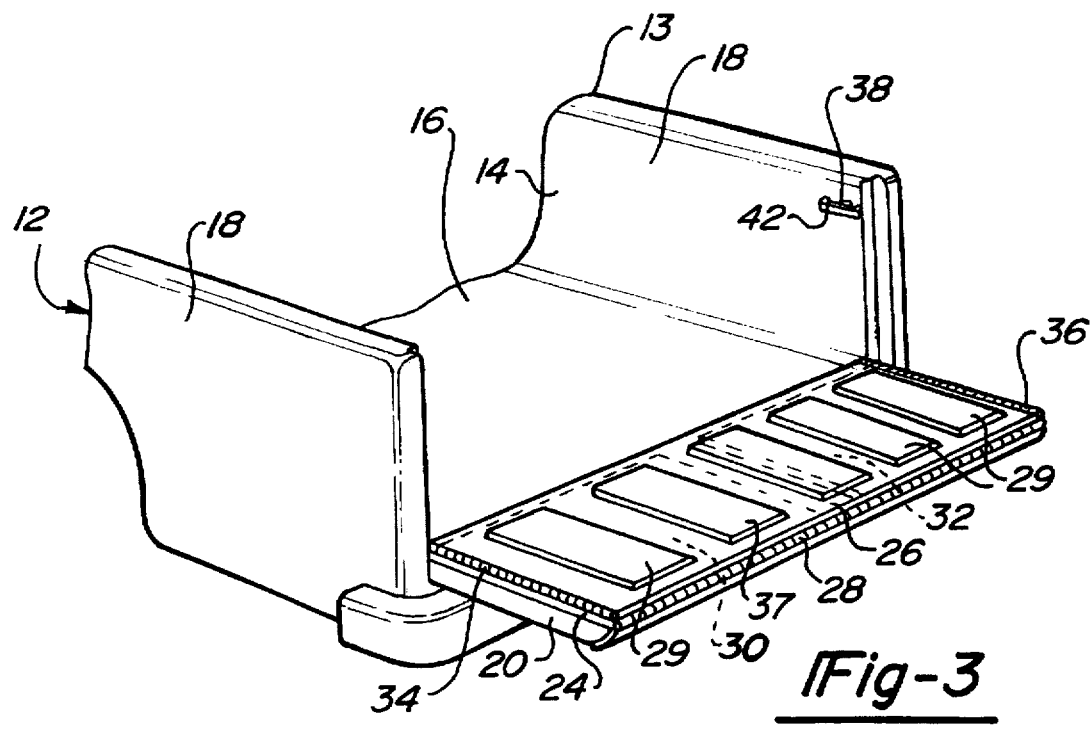
FIG. 3 is a view similar to FIG. 1 illustrating the extender in a down and stowed position.

Referring to FIGS. 1 through 3, an extender 10, according to the present invention, is used in connection with a vehicle such as a pick-up truck, generally indicated at 12. Such pick-up trucks 12 typically include a cab (not shown) and a bed 13 forming a cargo area 14. The bed 13 includes a floor 16, two sides 18 and a tailgate 20 which define the cargo area 14. The extender 10, according to the present invention, has a bottom section 24 fixedly mounted or attached to the tailgate 20 by suitable means such as fasteners 25. The extender 10 also includes a rear section 26 which is pivotally attached to the bottom section 24 by suitable means such as a hinge 28. The rear section 26 includes at least one, preferably a plurality of ribs 29 for strength and durability. The extender 10 further includes opposed side sections 30 and 32 pivotally attached to sides of the rear section 26 by suitable means such as hinges 34 and 36, respectively. Each side section includes at least one, preferably a plurality of ribs 37 for strength and durability. The bottom section 24, rear section 26 and side sections 30 and 32 are generally rectangular in shape and made of a durable ferrous, non-ferrous, metallic, wooden, rubberized or plastic like material that will withstand rugged use. It should be appreciated that the bottom section 24, rear section 26 and side sections 30 and 32 are made of the same material. It should also be appreciated that the extender 10 may have reflective material on the rear section 26 to warn following vehicles that the bed 13 is extended beyond the normal limits of the bed 13.

Figure 4:
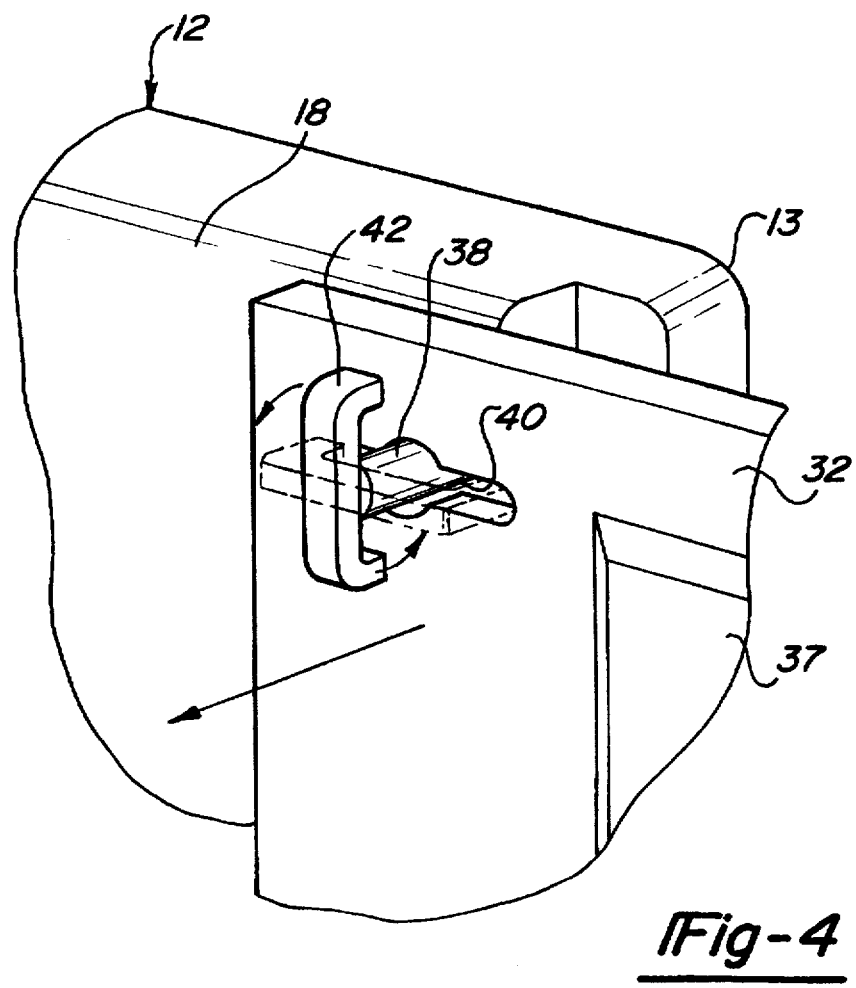
FIG. 4 is an enlarged perspective view of a portion in circle 4 of FIG. 1.

The extender 10 includes at least one fastener mechanism 38 for each side section 30 and 32 to hold the extender 10 in its full upright and closed position illustrated in FIG. 1. The fastener mechanism 38 is generally T shaped as illustrated in FIG. 4 or in any other suitable shape. Each of the opposed side sections 30 and 32 include cooperating apertures 40 which receive a rotatable handle 42 of the fastener mechanism 38 when the handle 42 is horizontally disposed relative to the floor 16 of the bed 13. To secure the side sections 30 and 32 to the sides 18, the handle 42 is rotated to a vertical position relative to the floor 16 to automatically lock the side sections 30 and 32 in place. It should be appreciated that the side sections 30 and 32 extend generally perpendicular to the rear section 26 and are removably fastened to the inner surface of the sides 18 of the bed 13. It should also be appreciated that when the fastener mechanisms 38 are not used to secure the side sections 30 and 32 to the bed 13 they can be used as tie downs for small loads.

When the extender 10 is stowed away in a down and stowed position as illustrated in FIG. 3, the bottom section 24 of the extender 10 lays flat against the tailgate 20 of the vehicle 12. The two side sections 30 and 32 are folded in toward the middle and the rear section 26 folds down over the side sections 30 and 32 to form an unobtrusive plane across the rear interior of the cargo area 14 when the tailgate 20 is in the closed and locked position. The extender 10 is held in place when not in use by a fastening mechanism (not shown) which secures the extender 10 in its locked position against the rear of the pick-up truck 12, allowing maximum cargo space 14 in the interior of the bed 13. It should be appreciated that when closed, the extender 10 intrudes only a minimal distance into the cargo area 14 of the pick-up truck 12, allowing for maximum cargo capacity when the tailgate 20 is up and a load is being carried in the bed 13 without the use of the extender 10.

When the extender 10 is upright in use in the upright and closed position illustrated in FIG. 1, the extender 10 is unlocked from its down and stowed position. The rear section 26 is raised and folded outward, allowing the two side sections 30 and 32 to be placed in their vertical and upright positions for locking to the bed 13 of the pick-up truck 12. The fastening mechanisms 38 are extended through the apertures 40 and the handles 42 are rotated. It should be appreciated that when the extender 10 is in this position, the load in the bed 13 is secure for normal travel conditions. It should also be appreciated that the fastening mechanisms 38 allow the operator to disengage the extender 10 from its upright and closed position without disturbing the load and is strong enough to hold the load in place in the bed 13 when traveling. It should further be appreciated that the fastening mechanisms 38 lock the extender 10 in its upright and closed position for load transportation and allows for easy loading and unloading over the tailgate 20 of the pick-up truck 12. It should be appreciated that the portion of the fastening mechanism 38 that is attached to the bed 13 can be used as a tie down when the extender 10 is not in use.

Further, and during loading operation of the pick-up truck 12, the individual components of the extender 10 can be positioned to make loading and unloading easy for one person. More specifically, the rear section 26 is folded outward and down and the two side sections 30, 32 are similarly folded outward and down. The extender 10 is thus completely out of the way for any loading and unloading situation as illustrated in FIG. 2. It should be appreciated that, whether at a loading dock or from the standing position, the extender 10 does not interfere with the loading operations.

Accordingly, the extender 10 is a four-sided hinged collapsible compartment which extends the length of any bed 13 to the full length of the bed, plus the length of the tailgate 20 when it is in the down and open position. The extender 10 also lengthens the bed on a short-bed vehicle enough to accommodate standard eight foot lengths of building material when the tailgate 20 is down and the extender 10 is in its upright and locked position while providing an enclosed cargo area 14 which is protective for the load. The extender 10 provides a secure, three side compartment which does not permit the material to slide out of the rear of the bed 13 because the three sides create a secure structure that holds the load much the same way as would the bed 13 itself.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An extender for a bed of a vehicle comprising:

a bottom section fixedly mounted and non-movable relative to a tailgate of a bed of a vehicle;

a rear section pivotally attached to said bottom section;

opposed side sections pivotally attached to sides of said rear section; and a fastener mechanism to removably fasten each of said opposed side sections to an inner surface of the bed.

2. An extender as set forth in claim 1 including a hinge for pivotally attaching said rear section to said bottom section.

3. An extender as set forth in claim 1 including a hinge for pivotally attaching each of said opposed side sections to a side of said rear section.

4. An extender as set forth in claim 1 wherein said fastener mechanism comprises a T-shaped fastener secured to the inner surface of the bed and an aperture extending through each of said opposed side sections.

5. An extender as set forth in claim 4 wherein said fastener has a handle which extends through said aperture and is rotated to prevent said handle from exiting said aperture.

6. An extender for a bed of a pick-up truck comprising:

a bottom section and fasteners for fixedly and non-movably mounting said bottom section to a tailgate of a bed of a pick-up truck;

a rear section pivotally attached to said bottom section;

opposed side sections pivotally attached to sides of said rear section; and a fastener mechanism to removably fasten each of said opposed side sections to an inner surface of the bed.

7. An extender as set forth in claim 6 wherein said fastener mechanism comprises a T-shaped fastener secured to the inner surface of the bed and an aperture extending through each of said opposed side sections.

8. An extender as set forth in claim 7 wherein said fastener has a handle which extends through said aperture and is rotated to prevent said handle from exiting said aperture.

9. An extender as set forth in claim 6 including a hinge for pivotally attaching said rear section to said bottom section.

10. An extender as set forth in claim 6 including a hinge for pivotally attaching each of said opposed side sections to a side of said rear section.

11. An extender for a bed of a pick-up truck comprising:

a bottom section fixedly mounted and non-movable relative to a tailgate of a bed of a pick-up truck;

a rear section pivotally attached to said bottom section;

opposed side sections pivotally attached to sides of said rear section; and a T-shaped fastener secured to an inner surface of each side of the bed and an aperture extending through each of said opposed side sections having a handle which extends through said aperture and is rotated to prevent said handle from exiting said aperture to removably fasten each of said opposed side sections to the inner surface of the bed.

* * * * *